United States Patent Office 3,539,331
Patented Nov. 10, 1970

3,539,331
METHOD OF CONTROLLING
GROWTH OF PLANTS
Terrill D. Smith, Kirkwood, Mo., assignor to Monsanto Company, St. Louis, Mo., a corporation of Delaware
No Drawing. Continuation of application Ser. No. 536,608, Mar. 23, 1966. This application Oct. 17, 1968, Ser. No. 768,972
Int. Cl. A01n 9/36
U.S. Cl. 71—71                     20 Claims

ABSTRACT OF THE DISCLOSURE

Compositions containing phosphorodiamidates have utility as herbicides and defoliants.

---

This application is a continuation of application Ser. No. 536,608, filed Mar. 23, 1966, now abandoned.

This invention relates to phytotoxic compositions and to methods of controlling or modifying the growth of plants.

The terms "phytotoxic" and "phytotoxicity" are used herein to identify the plant growth modifying activity of the compounds useful in the compositions and methods of this invention. Such modifying activity includes all deviations from natural development, for example, killing, retardation, defoliation, desiccation, regulation, stunting, tillering, stimulation, dwarfing and the like. In like manner, the term "phytotoxicant" is used to mean materials which exhibit the above growth modifying activity.

The term "plant" as used herein and in the appended claims means, emerging seedlings and established vegetation including the roots and above ground portions.

In accordance with this invention, it has been found that the growth of emerging seedlings and established vegetation can be controlled or modified by a method which comprises exposing the emerging seedlings, the roots or above ground portions of established vegetation to an effective amount of one or more amidates of the formula

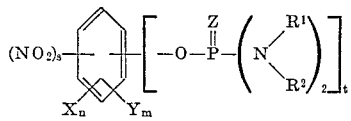

wherein X is halogen (Cl, Br, F and I), Y is selected from the group consisting of alkyl of not more than 18 carbon atoms, haloalkyl of not more than 18 carbon atoms containing 1, 2 or 3 halogen atoms (Cl, Br, I and F), and alkoxy of not more than 4 carbon atoms; $R^1$ and $R^2$ are each selected from the group consisting of H, $CH_3$ and $CH_2R^3X^1_a$ wherein $R^3$ is hydrocarbyl of not more than 12 carbon atoms selected from the group consisting of alkyl, alkenyl and alkynyl, $X^1$ is halogen (Cl, Br, F and I) and $a$ is an integer from 0 to 3; Z is selected from the group consisting of oxygen and sulfur, $s$ is an integer from 0 to 2 inclusive, $t$ is an integer from 1 to 2, $m$ is an integer from 0 to 3 inclusive, and $n$ is an integer from 0 to 5 inclusive.

In the above formula Y can be alkyl such as methyl, ethyl, n-propyl, isopropyl, n-butyl, sec-butyl, isobutyl, tert-butyl, amyl, hexyl, heptyl, octyl, nonyl, decyl, undecyl, dodecyl, octadecyl and the various homologues and isomers of alkyl of not more than 18 carbon atoms, haloalkyl such as chloromethyl, iodomethyl, bromomethyl, fluoromethyl, trichloromethyl, chloroethyl, iodoethyl, trifluoromethyl, bromoethyl, difluoromethyl, dichloromethyl, diiodoethyl, dibromoethyl, fluoroethyl, dichloroethyl, chloro-n-propyl, bromo-n-propyl, iodoisopropyl, bromo - n - butyl, bromo-tert-butyl, 1,3,3-trichlorobutyl, 1,3,3-trifluorobutyl, 1,3,3-tribromobutyl, 1,3,3-trichlorooctyl and the halogenated straight and branched chain alkyl of not more than 18 carbon atoms, and alkoxy such as methoxy, ethoxy, n-propoxy, isopropoxy, n-butoxy, isobutoxy, sec- butoxy and tert-butoxy. When $R^1$ and $R^2$ are represented by $CH_2R^3X^1_a$, the $R^3X^1_a$ can be for example, alkyl such as methyl, ethyl, n-propyl, isopropyl, n-butyl, sec-butyl, isobutyl, tert-butyl, amyl, hexyl, heptyl, octyl, nonyl, decyl, dodecyl and the various homologues and isomers of alkyl having from 1 to 12 carbon atoms, alkenyl such as vinyl, allyl, n-butenyl-1-, n-butenyl-2, n-pentenyl-2, 2,3-dimethyl-1-pentenyl, n-hexenyl-2, 2,3-dimethylbutenyl-2, n-heptenyl, n-decenyl, n-dodecenyl and the various homologues and isomers of alkenyl having 2 to 12 carbon atoms, alkynyl such as propargyl and the various homologues and isomers of alkynyl having from 3 to 12 carbon atoms, haloalkyl such as chloromethyl, iodomethyl, bromomethyl, fluoromethyl, trichloromethyl, trifluoromethyl, tribromomethyl, chloroethyl, iodoethyl, bromoethyl, fluoroethyl, dichloromethyl, diiodomethyl, dibromomethyl, difluoromethyl, dichloroethyl, difluoroethyl, chloro-n-propyl, bromo-n-propyl, iodoisopropyl, bromo - n - butyl, bromo-tert-butyl, 1,3,3-trichlorobutyl, 1,3,3-tribromobutyl, chloropentyl, bromopentyl, 2,3-dichloropentyl, 3,3-dibromopentyl, chlorohexyl, bromohexyl, 2,4-dichlorohexyl, 1,3-dibromohexyl, 1,3,4-trichlorohexyl, chloroheptyl, bromoheptyl, fluoroheptyl, 1,3-dichloroheptyl, 1,4,4-trichloroheptyl, 2,4-di(chloromethyl)heptyl, chlorooctyl, bromooctyl, iodooctyl, 2,4-di-(chloromethyl)hexyl, 2,4-dichlorooctyl, 2,4,4-tri(chloromethyl)pentyl, 1,3,5-tribromooctyl and the halogenated straight and branched chain nonyl, decyl, undecyl and dodecyl; haloalkenyl such as chlorovinyl, bromovinyl, chloroallyl, bromoallyl, 3-chloro-n-butenyl-1, 3-chloro-n-pentenyl - 1,4 - chloro-n-hexenyl-2, 3,4-di(chloromethyl) pentenyl-1, 3-fluoro-n-heptenyl-1, 1,3,3-trichloro-n-heptenyl-5, 1,3,5-trichloro-n-octenyl-6, 2,3,3-tri(chloromethyl)-pentenyl-4 and the various homologues and isomers of haloalkenyl having 2 to 12 carbon atoms, and haloalkynyl such as chloropropargyl, bromopropargyl, iodopropargyl and the various homologues and isomers of haloalkynyl having 3 to 12 carbon atoms.

The amidates of the above formula are effective as general phytotoxicants including post-emergent phytotoxicants and defoliating phytotoxicants, but their most outstanding utility is as post-emergent phytotoxicants. Furthermore, these compounds are characterized by a broad spectrum of herbicidal or phytotoxic activity, i. e., they modify the growth of a wide variety of plants including both monocotyledonous and dicotyledonous plants. For the sake of brevity and simplicity, the term "active ingredient" will be used hereinafter in this specification to describe the amidate phytotoxicants of this invention.

In practicing the phytotoxic or herbicidal methods of this invention the active ingredients can be used alone or in combination with a material referred to in the art as a phytotoxic adjuvant in liquid or solid form. The phytotoxic compositions of this invention are prepared by admixing the active ingredient with an adjuvant including diluents, extenders, carriers and conditioning agents to provide compositions in the form of finely divided particulate solids, granules, pellets, solutions and aqueous dispersions or emulsions. Thus the active ingredient can be used with an adjuvant such as a finely-divided particulate solid, a solvent liquid of organic origin, water, a wetting agent, dispersing agent, an emulsifying agent or any suitable combination of these.

Typical finely-divided solid carriers and extenders which can be used in the phytotoxic compositions of this invention include for example, the talcs, clays, pumice, silica, diatomaceous earth, quartz, Fuller's earth, salt, sulfur, powdered cork, powdered wood, walnut flour, chalk, tobacco dust, volcanic ash, charcoals and the like. Typical liquid diluents include for example, kerosene, Stoddard solvent, hexane, benzene, toluene, acetone, ethylene dichloride, xylene, alcohols, diesel oil, glycols and the like.

The phytotoxic compositions of this invention, particularly liquids and wettable particles, usually contain as a conditioning agent one or more surface-active agents in amounts sufficient to render a given composition readily dispersible in water or in oil. By the term "surface-active agent" it is understood that wetting-agents, dispersing agents, suspending agents and eumlsifying agents are included therein.

The term "phytotoxic composition" as used herein and in the appended claims includes not only compositions in a suitable form for application but also concentrated compositions which require dilution or extension with a suitable quantity of liquid or solid adjuvant prior to application.

The following examples will illustrate the invention. In these examples, as well as in the specification and appended claims, parts and percent are by weight unless otherwise indicated.

EXAMPLE 1

The post-emergent phytotoxicity of representative amidates of this invention is demonstrated as follows: A good grade of top soil is placed in 9½" x 5¾" x 2¾" aluminum pans and compacted to a depth of ⅜" to ½" from the top of each pan. A predetermined number of seeds of each of a number of plant species are placed on top of the soil in separate pans. The pans are then filled with top soil and leveled. Initial watering is carried out by permitting the soil to absorb moisture through the apertured bottom of the pans. The seed containing pans are placed on a wet sand bench and maintained for 21 days under ordinary conditions of sunlight and watering. The active ingredients are then applied in spray form to the 21-day old plants. The phytotoxic sprays are acetone-water solutions containing 0.5%, 0.2% and 0.05% active ingredient. The solutions are applied to the plants in different sets of pans at rates equal to approximately 10, 4 and 1 pounds of active ingredient per acre. The treated plants are placed in a greenhouse and the effects are observed and recorded after 14 days.

The post-emergent phytotoxic activity index used in this example is based on the average percent injury of each plant species. The activity index is converted to a relative numerical scale for the sake of brevity and simplicity in the presentation of results. The post-emergent phytotoxic activity index used in Table I is defined as follows:

| Average percent injury | Numerical scale | Phytotoxic activity |
|---|---|---|
| 0 to 25 | 0 | No phytotoxicity. |
| 26 to 50 | 1 | Slight phytotoxicity. |
| 51 to 75 | 2 | Moderate phytotoxicity. |
| 76 to 99 | 3 | Severe phytotoxicity. |
| 100 | 4 | Plants dead. |

The identification of the plants used in this example is as follows:

A—General grass  
B—General broadleaf  
C—Wild oats  
D—Bromegrass  
E—Ryegrass  
F—Radish  
G—Sugar beet  
H—Corn  
I—Foxtail  
J—Barnyard grass  
K—Crabgrass  
L—Pigweed  
M—Wild buckwheat  
N—Smartweed  
O—Lambsquarter  
P—Coffeeweed Results and further details are given below in Table I

TABLE I.—POST-EMERGENT PHYTOTOXIC ACTIVITY

| Compound | Rate, lbs./acre | A | B | C | D | E | F | G | H | I | J | K | L | M | N | O | P |
|---|---|---|---|---|---|---|---|---|---|---|---|---|---|---|---|---|---|
| (1) | 10 | 2 | 3 | 3 | 3 | 3 | 4 | 4 |   | 3 |   | 3 | 3 | 4 |   |   |   |
|     | 4  | 2 | 2 | 2 | 2 |   |   | 4 | 3 |   | 2 | 4 | 4 |   | 3 | 4 | 2 |
|     | 1  | 0 | 0 | 0 | 0 |   |   | 0 | 1 |   | 0 | 1 | 1 |   | 0 | 2 | 0 |
| (2) | 10 | 3 | 3 | 3 | 4 | 3 | 4 | 4 |   | 3 |   | 3 | 4 | 4 |   |   |   |
|     | 4  | 2 | 2 | 3 | 2 |   |   | 3 | 3 |   | 3 | 4 | 4 |   | 3 | 4 | 3 |
|     | 1  | 0 | 0 | 0 | 0 |   |   | 0 | 1 |   | 0 | 1 | 0 |   | 0 | 3 | 1 |
| (3) | 10 | 2 | 2 | 2 | 2 | 1 | 3 | 3 |   | 3 |   | 3 | 4 | 3 |   |   |   |
|     | 4  | 1 | 2 | 1 | 1 |   |   | 2 | 2 |   | 1 | 3 | 4 |   | 2 | 4 | 3 |
|     | 1  | 0 | 0 | 0 | 0 |   |   | 0 | 1 |   | 0 | 1 | 1 |   | 1 | 2 | 1 |
| (4) | 10 | 0 | 3 | 1 | 1 | 1 | 3 | 4 |   | 1 |   |   | 1 | 4 | 3 |   |   |
|     | 4  | 0 | 1 | 0 | 2 |   |   | 3 | 1 |   | 0 | 1 | 4 |   | 1 | 4 | 1 |
|     | 1  | 0 | 0 | 0 | 0 |   |   | 0 | 0 |   | 0 | 0 | 0 |   | 0 | 0 | 0 |
| (5) | 10 | 2 | 3 | 1 | 2 | 2 | 3 | 4 |   | 4 |   | 3 | 4 | 3 |   |   |   |
|     | 4  | 1 | 2 | 1 | 1 |   |   | 3 | 2 |   | 1 | 2 | 3 |   | 3 | 4 | 3 |
|     | 1  | 0 | 0 | 0 | 1 |   |   | 1 | 1 |   | 1 | 3 | 0 |   | 0 | 2 | 2 |
| (6) | 10 | 3 | 3 | 4 | 3 | 3 | 4 | 4 |   | 3 |   | 4 | 1 | 4 |   |   |   |
|     | 4  | 2 | 2 | 2 | 2 |   |   | 3 | 3 |   | 2 | 3 | 3 |   |   |   |   |
|     | 1  | 0 | 0 | 0 | 0 |   |   | 1 | 1 |   | 0 | 2 | 1 |   |   |   |   |
| (7) | 10 | 0 | 1 | 0 | 0 | 0 | 3 | 2 |   | 1 |   | 1 | 3 | 1 |   |   |   |
| (8) | 10 | 0 | 1 | 1 | 0 | 0 | 1 | 1 |   | 1 |   | 1 | 4 | 0 |   |   |   |
| (9) | 10 | 0 | 1 | 0 | 0 | 0 | 1 | 1 |   | 0 |   | 0 | 4 | 1 |   |   |   |
| (10) | 10 | 1 | 2 | 1 | 1 | 2 | 2 | 3 |   | 1 |   | 2 | 4 | 2 |   |   |   |
|      | 4  | 0 | 1 | 1 | 1 |   |   | 3 | 2 |   | 1 | 2 | 4 |   | 1 | 3 | 2 |
|      | 1  | 0 | 0 | 0 | 0 |   |   | 0 | 0 |   | 0 |   | 4 |   | 0 | 1 | 1 |

NOTE:
(1) O-[(m-trifluoromethyl)phenyl]-N,N'-di-n-butyl-N,N'-dimethylphosphorodiamidate.
(2) O-(m-chlorophenyl)-N,N'-diisobutyl-N,N'-dimethylphosphorodiamidate.
(3) O-phenyl-N,N'-diisobutyl-N,N'-dimethylphosphorodiamidate.
(4) O-phenyl-N,N'-dimethyl-N,N'-dipropylphosphorodiamidate.
(5) O-(3,4-dichlorophenyl)-N,N'-di-n-butyl-N,N'-dimethylphosphorodiamidate.
(6) O-phenyl-N,N'-diethyl-N,N'-di-n-propylphosphorodiamidate.
(7) O-phenyl-N,N'-dimethyl-N,N'-di-n-octylphosphorodiamidate.
(8) O-phenyl-N,N'-tetramethylphosphorodiamidate.
(9) O,O'-m-phenylenebis-(N,N-dimethylphosphorodiamidate).
(10) O-phenyl-N,N'-dimethyl-N,N'-di-n-heptylphosphorodiamidate.

The data in Table I illustrate the general post-emergent phytotoxic activity of representative amidates useful in the compositions and methods of this invention. It will be noted that they control the most prevalent dicotyledonous weed families, namely pigweed and lambsquarter, at very low application rates, and that they control two major weedy monocotyledons, namely crab grass and barnyard grass. It will also be noted that unusual dicotyledonous selectivity is obtained with certain of the amidates, for example, O-phenyl-N,N'-dimethyl-N,N'-dipropylphosphorodiamidate.

EXAMPLE 2

The defoliant phytotoxic activity of representative amidates of this invention is demonstrated as follows. Three-week old cotton and soybean plants grown in the manner described above for the post-emergent tests are treated with the same phytotoxic sprays as above at rates given in Table II. The treated plants are placed in a greenhouse and the effects are observed and recorded after 14 days. The defoliant phytotoxic activity index used is based on the average percent defoliation of each plant species. The activity index is converted to a relative letter scale for the sake of brevity and simplicity in the presentation of results. The defoliant phytotoxic activity index used in Table II is defined as follows:

| Average percent defoliation | Letter scale | Defoliant activity |
| --- | --- | --- |
| 0 to 25 | A | No defoliation. |
| 26 to 50 | B | Slight defoliation. |
| 51 to 75 | C | Moderate defoliation. |
| 76 to 100 | D | Severe defoliation. |

Results and further details are presented in Table II.

TABLE II.—DEFOLIANT PHYTOTOXIC ACTIVITY

| Compound | Rate, lbs./acre | Cotton | Soybean |
| --- | --- | --- | --- |
| (1) | 4 | | C |
| | 5 | B | |
| | 10 | | D |
| (2) | 4 | | B |
| | 5 | B | |
| (3) | 4 | | D |
| | 10 | | C |
| (4) | 4 | | A |
| | 5 | C | |
| | 10 | | C |
| (5) | 4 | | B |
| | 1 | | D |
| | 5 | B | |
| (10) | 10 | | D |
| | 4 | | C |
| | 1 | | B |

NOTE:
(1) O-[(m-trifluoromethyl)phenyl]-N,N'-di-n-butyl-N,N'-dimethylphosphorodiamidate.
(2) O-(m-chlorophenyl)-N,N'-di-n-butyl-N,N'-dimethylphosphorodiamidate.
(3) O-phenyl-N,N'-diisobutyl-N,N'-dimethylphosphorodiamidate.
(4) O-phenyl-N,N'-dimethyl-N,N'-dipropylphosphorodiamidate.
(5) O-(3,4-dichlorophenyl)-N,N'-di-n-butyl-N,N'-dimethylphosphorodiamidate.
(10) O-phenyl-N,N'-dimethyl-N,N'-di-n-heptylphosphorodiamidate The following amidates are also useful in the compositions and methods of this invention:

O-phenyl-N,N'-dimethyl-N,N'-dipropenylphosphorodiamidate
O-phenyl-N,N'-dimethyl-N,N'-di-2-heptenylphosphorodiamidate
O-phenyl-N,N'-dibutyl-N,N'-dipropargylphosphorodiamidate
O-phenyl-N,N'-didodecyl-N,N'-di-n-propylphosphorodiamidate
O-phenyl-N,N'-di-2-octenyl-N,N'-dimethylphosphorodiamidate
O-phenyl-N,N'-dibutenyl-2-N,N'-dimethylphosphorodiamidate
O-phenyl-N,N'-di(2-chlorobutyl)-N,N'-di(2-chloroethyl)phosphorodiamidate
O-phenyl-N,N'-di(2-fluoroethyl)-N,N'-dimethylphosphorodiamidate
O-phenyl-N,N'-di(2-bromoethyl)-N,N'-di(2-chlorobutyl)phosphorodiamidate
O-phenyl-N,N'-di(3-chlorooctyl)-N,N'-dimethylphosphorodiamidate
O-phenyl-N,N'-di(2-chlorobutenyl)-3-N,N'-dimethylphosphorodiamidate
O-phenyl-N,N'-dimethyl-N,N'-di(2-bromoethyl)phosphorodiamidate
O-phenyl-N,N'-di(3-chloroheptenyl-2)-N,N'-dimethylphosphorodiamidate
O-(2,4,6-trichlorophenyl)-N,N'-dimethyl-N,N'-di-n-butylphosphorodiamidate
O-(2,4-difluorophenyl)-N,N'-dimethyl-N,N'-di-n-butylphosphorodiamidate
O-(4-iodophenyl)-N,N'-dimethyl-N,N'-di-n-butylphosphorodiamidate
O-(3,5-dibromophenyl)-N,N'-dimethyl-N,N'-di-n butylphosphorodiamidate
O-(4-methylphenyl)-N,N'-dimethyl-N,N'-di-n-butylphosphorodiamidate
O-(2,4-dimethylphenyl)-N,N'-dimethyl-N,N'-di-n butylphosphorodiamidate
O-(2-tert-butylphenyl)-N,N'-diisopropyl-N,N'-dimethylphosphorodiamidate
O-(2,6-di-tert-butylphenyl)-N,N'-diisopropyl-N,N'-dimethylphosphorodiamidate
O-(2,4,6-trimethylphenyl)-N,N'-disopropyl-N,N'-dimethylphosphorodiamidate
O-(4-methoxyphenyl)-N,N'-diisopropyl-N,N'-dimethylphosphorodiamidate
O-(2,4,-dibutoxyphenyl)-N,N'-diisopropyl-N,N'-dimethylphosphorodiamidate
O-[2,4-di(trifluoromethyl)phenyl]N,N'-diisopropyl-N,N'-dimethylphosphorodiamidate
O-(4-chloromethylphenyl)-N,N'-diisopropyl-N,N'-dimethylphosphorodiamidate
O-(2-chloro-4-methylphenyl)-N,N'-diisopropyl-N,N'-dimethylphosphorodiamidate
O-(2,4-dichloro-6-tert-butylphenyl)-N,N'-diisopropyl-N,N'-dimethylphosphorodiamidate
O-(2,6-dichloro-4-methoxyphenyl)-N,N'-diisopropyl-N,N'-dimethylphosphorodiamidate
O-(4-nitrophenyl)-N,N,N',N'-tetramethylphosphorodiamidate
O-(2-octylphenyl)-N,N'-dimethyl-N,N'-di-n-butylphosphorodiamidate
O-(4-tetradecylphenyl)-N,N'-dimethyl-N,N'-di-n-butylphosphorodiamidate
O-(2,4-dihexadecylphenyl)-N,N'-dimethyl-N,N'-di-n butylphosphorodiamidate
O-(4-octadecylphenyl)-N,N'-dimethyl-N,N'-di-n-butylphosphorodiamidate
O-(2,4-didodecylphenyl)-N,N'-dimethyl-N,N'-di-n-butylphosphorodiamidate
O-phenyl-N,N,N',N'-tetramethylphosphorothionodiamidate
O-[(m-trifluoromethyl)phenyl]-N,N'-di-n-butyl-N,N'-dimethylphosphorothionodiamidate
O-(3,4-dichlorophenyl)-N,N'-di-n-butyl-N,N'-dimethylphosphorothionodiamidate
O-(4-chlorophenyl)-N,N'-di-n-butyl-N,N'-dimethylphosphorothionodiamidate
O-(4-methylphenyl)-N,N'-di-n-butyl-N,N' dimethylphosphorothionodiamidate
O-(2-nitrophenyl)-N,N'-di-n-butyl-N,N'-dimethylphosphorothionodiamidate
O,O'-p-phenylenebis-(N,N-dimethylphosphorodiamidate)
O,O'-p-phenylenebis-(N,N'-dimethylphosphorothionoamidate)

As mentioned hereinbefore the phytotoxic compositions of this invention comprise an active ingredient and one or more phytotoxic adjuvants which can be solid or liquid extenders, carriers, diluents, conditioning agents and the like. Preferred phytotoxic compositions containing the active ingredients of this invention have been developed so that the active ingredients can be used to the greatest advantage to modify the growth of plants in soil. The preferred compositions comprise certain wettable powders, aqueous suspensions, dust formulations, granules, emulsifiable oils and solution in solvents. In general these preferred compositions can all contain one or more surface-active agents.

Surface-active agents which can be used in the phytotoxic compositions of this invention are set out, for example, in Searle U.S. Pat. 2,426,417, Todd U.S. Pat. 2,655,447, Jones U.S. Pat. 2,142,510 and Lenher U.S. Pat. 2,139,276. A detailed list of such agents is also set forth by J. W. McCutcheon in, "Soap and Chemical Specialties," November 1947, page 8011, et seq., entitled, "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general less than 15 parts by weight of the surface active agent is present per 100 parts by weight of phytotoxic composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 parts of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense, finely-divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for phytotoxic dusts include micaceous talcs, illitic clay, pyrophyllite, dense kaolin clays, ground calcium phosphate, rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and antifoam agents may also be found as components of a dust.

Emulsifiable oils are usually solutions of active ingredient in water-immiscible solvents together with a surfactant. Suitable solvents for the active ingredient of this invention include hydrocarbons and water-immiscible ethers, esters or ketones. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite, illitic clay or bentonitic clays. These extenders are sprayed or blended with the active ingredient to form the phytotoxic granules.

The mineral particles which are used in the granular phytotoxic compositions of this invention usually have a size range of 10 to 100 mesh, but preferably such that a large majority of the particles have from 14 to 80 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U. S. Sieve series.

The granular phytotoxic compositions of this invention generally contain from about 0.05 part to about 30 parts by weight of amidate per 1 part by weight of clay and 0 to about 0.05 part by weight of wetting agent per 1 part by weight of clay. The preferred phytotoxic granular compositions contain from about 0.1 part to about 2.5 parts by weight of active ingredient per 1 part by weight of clay.

The phytotoxic compositions of this invention can also contain other additaments, for example, fertilizers, other phytotoxicants, pesticides and the like, used as adjuvant or in combination with any of the above-described adjuvants.

Phytotoxicants useful in combination with the above-described compounds include, for example, 2, 4-dichlorophenoxy-acetic acid, 2,4,5-trichlorophenoxyacetic acid, 2-methyl-4-chlorophenoxyacetic acid and the salts, esters and amides thereof; triazine derivatives, such as 2,4-bis (3 - methoxypropylamino)-6 - methylthio - S - triazine, 2 - chloro-4-ethylamino-6-isopropylamino-S-triazine, and 2-ethylamino - 4 - isopropylamino - 6 - methylmercapto-S-triazine; urea derivatives, such as 3-(3,4-dichlorophenyl)-1,1-dimethyl urea and 3-p-chlorophenyl)-1,1-dimethyl-urea; acetanilides such as N-isopropyl-α-chloroacetanilide, and N-ethyl-α-chloro-2-methylacetanilide and 2-tert-butyl-2'-chloro-6-methylacetanilide, and acetamides such as N,N-diallyl - α - chloro-acetamide, N-(α-chloroacetyl)hexamethylene imine, N,N-diethyl-α-bromoacetamide and the like. Fertilizers useful in combination with the active ingredients include, for example, ammonium nitrate, urea and superphosphate. Other useful additaments include materials in which plant organisms take root and grow such as compost, manure, humus, sand and the like.

When operating in accordance with the present invention, effective amounts of the amidates are dispersed in soil or plant growth media and applied to plants in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid phytotoxic compositions to the surface of soil or to plants can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the phytotoxicants.

The application of an effective or phytotoxic amount of the amidates to the soil or growth media or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific amidate employed. In foliar treatment for the control or modification of vegetative growth, the active ingredients are applied in amounts from about 0.01 to about 50 or more pounds per acre. In applications to soil for the control or modification of the growth of emerging seedlings and established vegetation, the active ingredients are applied in amounts from about 1 to about 25 or more pounds per acre. In such soil applications, it is desirable that the active ingredients be distributed to a depth of at least 0.2 inch and preferably in amounts from about 1 to about 25 pounds per acre. One skilled in the art can readily determine from this specification, including examples, the application rate for any specific situation.

The terms "soil" and "growth media" are employed in the present specification and claims in their broadest sense to be inclusive of all conventional "soils" as defined in Webster's New International Dictionary, second edition, unabridged (1961). Thus, the terms refer to any substance or media in which vegetation may take root and grow, and are intended to include not only earth but compost, manure, muck, humus, sand and the like, adapted to support plant growth.

The amidates useful in the compositions and methods of this invention can be prepared by the process disclosed in copending application, Ser. No. 479,319, filed Aug. 12, 1965, now abandoned.

Although the invention is described with respect to specific modifications, the details thereof are not to be construed as limitations except to the extent indicated in the following claims.

What is claimed is:
1. Method of controlling the post-emergent growth of plants which comprises contacting the plant to a herbicidal effective amount of a compound of the formula

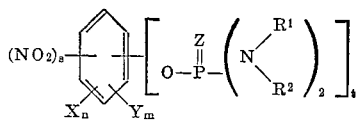

wherein X is halogen, Y is selected from the group consisting of alkyl of not more than 18 carbon atoms, haloalkyl of not more than 18 carbon atoms containing from 1 to 3 halogen atoms, and alkoxy of not more than 4 carbon atoms; $R^1$ and $R^2$ are each selected from the group consisting of hydrogen, $CH_3$ and $CH_2R^3X_a^1$ wherein $R^3$ is hydrocarbyl of not more than 12 carbon atoms selected from the group consisting of alkyl of not more than 12 carbon atoms, alkenyl of not more than 12 carbon atoms and alkynyl of not more than 3 carbon atoms, $X^1$ is halogen and $a$ is an integer from 0 to 3, inclusive; Z is selected from the group consisting of oxygen and sulfur; $s$ is an integer from 0 to 2, inclusive; $t$ is an integer from 1 to 2, inclusive; $m$ is an integer from 0 to 3, inclusive; and $n$ is an integer from 0 to 5, inclusive.

2. Method in accordance with claim 1, in which X is chlorine.

3. Method in accordance with claim 2, in which $R^1$ and $R^2$ are the group —$CH_2R^3X_a^1$ wherein $R^3$ is alkyl and $a$ is zero.

4. Method of claim 1 wherein the compound is O-[(m-trifluoromethyl)phenyl] - N,N'-di-n-butyl-N,N'-dimethylphosphorodiamidate.

5. Method of claim 1 wherein the compound is O-(m-chlorophenyl)-N,N'-di-n-butyl-N,N' - dimethylphosphorodiamidate.

6. Method of claim 1 wherein the compound is O-phenyl - N,N' - diisobutyl - N,N' - dimethylphosphorodiamidate.

7. Method of claim 1 wherein the compound is O-phenyl-N,N'-dimethyl-N,N'-dipropylphosphorodiamidate.

8. Method of claim 1 wherein the compound is O-(3,4-dichlorophenyl) - N,N' - di-n-butyl - N,N' - dimethylphosphorodiamidate.

9. Method of claim 1 wherein the compound is O-phenyl-N,N'-diethyl-N,N'-di-n-propylphosphorodiamidate.

10 Method of claim 1 wherein the compound is O-phenyl-N,N'-dimethyl - N,N' - di-n-octylphosphorodiamidate.

11. Method of claim 1 wherein the compound is O-phenyl-N,N,N',N'-tetramethylphosphorodiamidate.

12. Method of claim 1 wherein the compound is O,O'-m-phenylenebis-(N,N-dimethylphosphorodiamidate).

13. Method of claim 1 wherein the compound is O-phenyl-N,N'-dimethyl-N,N'-di-n - heptylphosphorodiamidate.

14. Method of claim 1 wherein the compound is O-[(m-trifluoromethyl)phenyl] - N,N,N',N' - tetramethylphosphorodiamidate.

15. Method in accordance with claim 1, in which $t$ is 1, Z is oxygen; and $s$ and $m$ are 0.

16. Method for the defoliation of plants which comprises contacting said plants with a defoliating amount of a compound of the formula

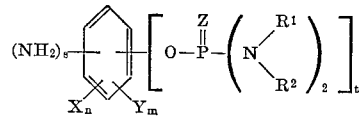

wherein X is halogen, Y is selected from the group consisting of alkyl of not more than 18 carbon atoms, haloalkyl of not more than 18 carbon atoms containing from 1 to 3 halogen atoms, and alkoxy of not more than 4 carbon atoms; $R^1$ and $R^2$ are each selected from the group consisting of H, $CH_3$, and $CH_2R^3X_a^1$ wherein $R^3$ is hydrocarbyl of not more than 12 carbon atoms selected from the group consisting of alkyl of not more than 12 carbon atoms, alkenyl of not more than 12 carbon atoms and alkynyl of not more than 3 carbon atoms, $X^1$ is halogen and $a$ is an integer from 0 to 3; Z is selected from the group consisting of oxygen and sulfur, $s$ is an integer from 0 to 2 inclusive, $t$ is an integer from 1 to 2, $m$ is an integer from 0 to 3 inclusive, and $n$ is an integer from 0 to 5 inclusive.

17. Method of claim 16 wherein $t$ is 1, Z is oxygen, and $s$ and $m$ are zero.

18. Method of claim 16 wherein $t$ is 1, Z is oxygen, $s$ and $m$ are zero and X is chlorine.

19. Method of claim 16 wherein $t$ is 1, Z is oxygen, $s$ and $m$ are zero, X is chlorine and $R^1$ and $R^2$ are $$-CH_2R^3X_a^1$$

wherein $R^3$ is alkyl and $a$ is zero.

20. Method of claim 16 wherein $t$ is 1, Z is oxygen, and $s$, $m$ and $n$ are zero.

References Cited

UNITED STATES PATENTS 3,231,359  1/1966  Newallis et al. _____ 71—87

FOREIGN PATENTS 242,206  12/1962  Australia.

JAMES O. THOMAS, Jr., Primary Examiner

U.S. Cl. X.R.

71—86, 87, 92, 93, 109, 110, 116, 117, 118, 120